US012646300B2

(12) United States Patent
Choi et al.

(10) Patent No.:   US 12,646,300 B2
(45) Date of Patent:         Jun. 2, 2026

(54) METAMORPHIC LABELING USING ALIGNED SENSOR DATA

(71) Applicant: Canoo Technologies Inc., Torrance, CA (US)

(72) Inventors: Jongmoo Choi, Gardena, CA (US); Mayukh Sattiraju, Redondo Beach, CA (US); Kilsoo Kim, Hermosa Beach, CA (US); David R. Arft, Torrance, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 380 days.

(21) Appl. No.: 17/815,702

(22) Filed: Jul. 28, 2022

(65) Prior Publication Data

US 2023/0061830 A1      Mar. 2, 2023

Related U.S. Application Data

(60) Provisional application No. 63/240,044, filed on Sep. 2, 2021.

(51) Int. Cl.
*G06V 10/776*        (2022.01)
*G06V 10/75*         (2022.01)
*G06V 10/774*        (2022.01)
(52) U.S. Cl.
CPC .......... *G06V 10/776* (2022.01); *G06V 10/751* (2022.01); *G06V 10/774* (2022.01)
(58) Field of Classification Search
CPC .. G06V 10/751; G06V 10/774; G06V 10/776; G06V 20/58; G06V 20/597; G06V 20/70
See application file for complete search history.

(56) References Cited

U.S. PATENT DOCUMENTS

2008/0169385 A1*   7/2008   Ashraf ................... B61L 29/22
                                                                  246/130
2018/0157920 A1*   6/2018   Hu ........................ G01S 7/4802
                                      (Continued)

OTHER PUBLICATIONS

Zhou et al., "Metamorphic Testing of Driverless Cars", Communications of the ACM, vol. 62, No. 3, Mar. 2019, 12 pages.
(Continued)

*Primary Examiner* — Michael J Vanchy, Jr.
(74) *Attorney, Agent, or Firm* — ALLEN, DYER, DOPPELT, + GILCHRIST, P.A. Attorneys at Law

(57)                    ABSTRACT

A method includes obtaining first and second data captured using different types of sensors. The method also includes obtaining first object detection results based on the first data and generated using a machine learning model, where the first object detection results identify one or more objects detected using the first data. The method further includes obtaining second object detection results based on the second data, where the second object detection results identify one or more objects detected using the second data. The method also includes identifying one or more inconsistencies between the first and second object detection results and generating labeled training data based on the one or more identified inconsistencies. In addition, the method includes retraining the machine learning model or training an additional machine learning model using the labeled training data.

15 Claims, 7 Drawing Sheets

(56) References Cited

U.S. PATENT DOCUMENTS

| | | | |
|---|---|---|---|
| 2020/0284883 A1 | 9/2020 | Ferreira et al. | |
| 2021/0166085 A1 | 6/2021 | Schlicht et al. | |
| 2021/0168318 A1* | 6/2021 | Eki | G06V 20/584 |
| 2021/0237768 A1 | 8/2021 | Tateishi et al. | |
| 2022/0126863 A1 | 4/2022 | Moustafa et al. | |
| 2022/0188695 A1* | 6/2022 | Zhu | G06N 20/00 |

OTHER PUBLICATIONS

Chen et al., "Metamorphic Testing: A Review of Challenges and Opportunities", ACM Computing Surveys, vol. 51, No. 1, Jan. 2018, 28 pages.
Segura et al., "A Survey on Metamorphic Testing", IEEE Transactions on Software Engineering, vol. 42, No. 9, Sep. 2016, 20 pages.
Susmelj, "Active Learning using Detectron2", lightly.ai, Jun. 2021, 11 pages.
"Helm.ai Pioneers Breakthrough . . . 'Deep Teaching' of Neural Networks", Helm.ai, Jun. 2020, 9 pages.
International Search Report and Written Opinion of the International Searching Authority dated Oct. 13, 2022 in connection with International Patent Application No. PCT/US2022/074240, 7 pages.
"Model in the Loop Data Curation", https://www.youtube.com/watch?v=iN6vTs743DM, Scale AI, Jul. 2021.

* cited by examiner

SELECTED ELEMENTS
300

FALSE NEGATIVES
308

TRUE NEGATIVES
304

302
TRUE POSITIVES

306
FALSE POSITIVES

LIDAR-PROJECTED
BOUNDING BOX
412

410
CAMERA-PROJECTED
BOUNDING BOX

LIDAR-PROJECTED
BOUNDING BOX
416

414
CAMERA-PROJECTED
BOUNDING BOX

METAMORPHIC LABELING USING ALIGNED SENSOR DATA

CROSS-REFERENCE TO RELATED APPLICATION AND PRIORITY CLAIM

This application claims priority under 35 U.S.C. § 119(e) to U.S. Provisional Patent Application No. 63/240,044 filed on Sep. 2, 2021. This provisional application is hereby incorporated by reference in its entirety.

TECHNICAL FIELD

This disclosure relates generally to object detection systems. More specifically, this disclosure relates to metamorphic labeling using aligned sensor data.

BACKGROUND

Identifying nearby, moving, or other objects in a scene is often an important or useful function in many autonomous applications, such as in vehicles supporting advanced driving assist system (ADAS) or autonomous driving (AD) features, or other applications. Performing accurate object detection using a camera ("camera object detection") may be desirable since cameras can be less expensive and less complex compared to sensors like light detection and ranging (LIDAR) sensors. Current state-of-the-art techniques for camera object detection often use a data-driven machine learning approach, such as deep learning. However, a machine learning model may include many tunable parameters (possibly millions of parameters) that need to be optimized during training in order to provide accurate object detection results. Machine learning models are often trained using collections of labeled data (meaning data where the correct machine learning model outputs are known), and the accuracy of the training increases as the amount of training data increases. As a result, using a large collection of labeled training data can help to greatly improve the accuracy of deep learning-based object detection models. Unfortunately, conventional approaches for preparing labeled training data relies on human annotators, which is time consuming and expensive.

SUMMARY

This disclosure provides metamorphic labeling using aligned sensor data.

In a first embodiment, a method includes obtaining first and second data captured using different types of sensors. The method also includes obtaining first object detection results based on the first data and generated using a machine learning model, where the first object detection results identify one or more objects detected using the first data. The method further includes obtaining second object detection results based on the second data, where the second object detection results identify one or more objects detected using the second data. The method also includes identifying one or more inconsistencies between the first and second object detection results and generating labeled training data based on the one or more identified inconsistencies. In addition, the method includes retraining the machine learning model or training an additional machine learning model using the labeled training data.

In a second embodiment, an apparatus includes at least one processing device configured to obtain first and second data captured using different types of sensors. The at least one processing device is also configured to obtain first object detection results based on the first data and generated using a machine learning model, where the first object detection results identify one or more objects detected using the first data. The at least one processing device is further configured to obtain second object detection results based on the second data, where the second object detection results identify one or more objects detected using the second data. The at least one processing device is also configured to identify one or more inconsistencies between the first and second object detection results and generate labeled training data based on the one or more identified inconsistencies. In addition, the at least one processing device is configured to retrain the machine learning model or train an additional machine learning model using the labeled training data.

In a third embodiment, a non-transitory machine-readable medium contains instructions that when executed cause at least one processor to obtain first and second data captured using different types of sensors. The medium also contains instructions that when executed cause the at least one processor to obtain first object detection results based on the first data and generated using a machine learning model, where the first object detection results identify one or more objects detected using the first data. The medium further contains instructions that when executed cause the at least one processor to obtain second object detection results based on the second data, where the second object detection results identify one or more objects detected using the second data. The medium also contains instructions that when executed cause the at least one processor to identify one or more inconsistencies between the first and second object detection results and generate labeled training data based on the one or more identified inconsistencies. In addition, the medium contains instructions that when executed cause the at least one processor to retrain the machine learning model or train an additional machine learning model using the labeled training data.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
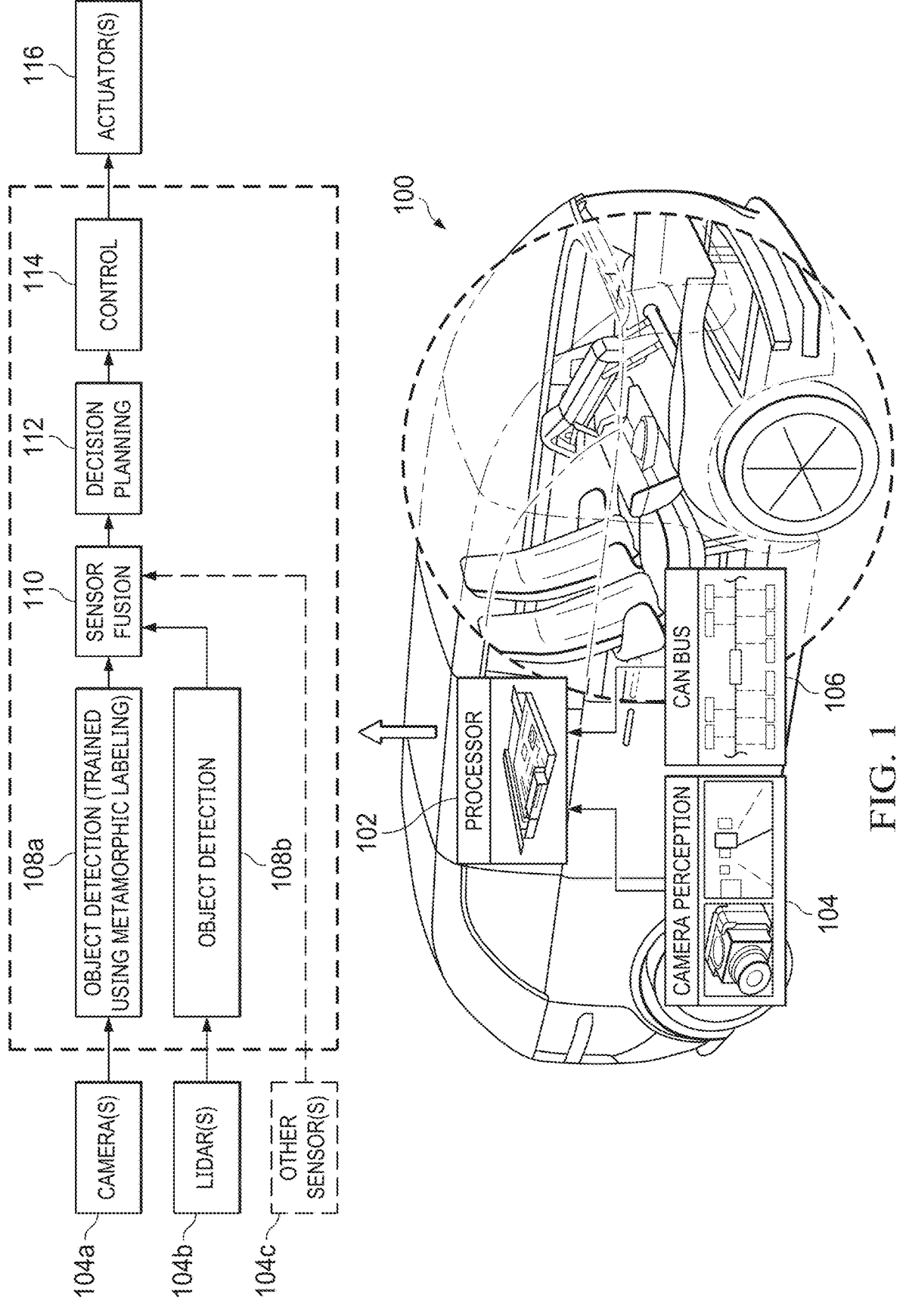
FIG. 1 illustrates an example system supporting metamorphic labeling using aligned sensor data according to this disclosure.

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, identifying nearby, moving, or other objects in a scene is often an important or useful function in many autonomous applications, such as in vehicles supporting advanced driving assist system (ADAS) or autonomous driving (AD) features, or other applications. Performing accurate object detection using a camera ("camera object detection") may be desirable since cameras can be less expensive and less complex compared to sensors like light detection and ranging (LIDAR) sensors. Current state-of-the-art techniques for camera object detection often use a data-driven machine learning approach, such as deep learning. However, a machine learning model may include many tunable parameters (possibly millions of parameters) that need to be optimized during training in order to provide accurate object detection results. Machine learning models are often trained using collections of labeled data (meaning data where the correct machine learning model outputs are known), and the accuracy of the training increases as the amount of training data increases. As a result, using a large collection of labeled training data can help to greatly improve the accuracy of deep learning-based object detection models. Unfortunately, conventional approaches for preparing labeled training data relies on human annotators, which is time consuming and expensive.

This disclosure provides techniques for generating training data for a camera object detection machine learning model based on metamorphic labeling using aligned sensor data. As described in more detail below, metamorphic labeling can be used with sensor data from two or more different types of sensors, such as from a camera and from a LIDAR sensor or from two different types of cameras. Object detection can be performed using each type of sensor, and one or more metamorphic relationships between the two or more different types of sensors can be used to identify inconsistencies in the object detection results. For example, since a LIDAR sensor is generally more accurate than a camera, the object detection results from the LIDAR sensor may be used as a reference for the object detection results from the camera. As another example, a depth camera and a red/green/blue-depth (RGB-D) camera may be used to capture images of a driver, and the object detection results from the depth camera may be used as a reference for the object detection results from the RGB-D camera (or vice versa). The object detection results from the different types of sensors can be used to identify inconsistent object detection results, and labeled training data can be generated for a camera object detection machine learning model based on the collected information and the identified inconsistencies.

In this way, labeled training data for a camera object detection machine learning model can be generated with little or no human annotators in the loop, which represents an efficient way to train machine learning models and deliver accurate and reliable trained camera object detection models. Moreover, this allows the camera object detection machine learning model to be improved over time as more and more training data is collected and used to train the machine learning model.

FIG. 1 illustrates an example system 100 supporting metamorphic labeling using aligned sensor data according to this disclosure. In this particular example, the system 100 takes the form of an automotive vehicle, such as an electric vehicle. However, any other suitable system may support metamorphic labeling using aligned sensor data, such as other types of vehicles, autonomous robots, or other autonomous or non-autonomous systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras or other imaging sensors, and the bus 106 represents a controller area network (CAN) bus. However, the processor 102 may interact with any additional sensor(s) and communicate over any other or additional bus(es).

The sensors 104 here include one or more cameras 104a that generate images of scenes around and/or within the system 100. The sensors 104 here may also include one or more LIDAR sensors 104b that generate LIDAR-based measurements for scenes around the system 100. One or more additional types of sensors 104c may further be included in the system 100 and used to capture other measurements associated with the environment around and/or within the system 100. Other types of sensors 104c that could be used here include one or more radio detection and ranging (RADAR) sensors, other types of imaging sensors, or inertial measurement units (IMUs). Measurements or other data from the sensors 104 are used by the processor 102 or other component(s) as described below to perform metamorphic labeling using aligned sensor data. In some cases, the sensors 104 may include a single camera 104a, such as one camera positioned on the front of a vehicle. In other cases, the sensors 104 may include multiple cameras 104a, such as one camera positioned on the front of a vehicle, one camera positioned on the rear of the vehicle, and two cameras positioned on opposite sides of the vehicle. In still other cases, the sensors 104 may include at least one camera 104a configured to capture images of scenes around the vehicle and/or at least one camera 104a configured to capture images of scenes within the vehicle. Similarly, the sensors 104 may include any suitable number of LIDAR sensors 104b in any suitable arrangement (or no LIDAR sensors 104b if the metamorphic labeling functionality is used with sensors other than LIDAR sensors).

The processor 102 can process the images from the one or more cameras 104a in order to detect objects around, proximate to, or within the system 100, such as one or more vehicles, obstacles, or people near the system 100 or a driver of the system 100. The processor 102 can also process the information from the sensors 104 in order to perceive lane-marking lines or other markings on a road, floor, or other surface. The processor 102 can further use various information to generate predictions associated with the system 100, such as to predict the future path(s) of the system 100 or other vehicles, identify a center of a lane in which the system 100 is traveling, or predict the future locations of objects around the system 100. In addition, the processor 102 can process the information from the sensors 104 to perform metamorphic labeling using aligned sensor data, which allows for the generation of labeled training data to support the training or retraining of at least one machine learning model used for object detection.

In this example, the processor 102 performs an object detection function 108a, which generally involves identifying objects around or within the system 100 in a real-time manner based on images from the camera(s) 104a. For example, the object detection function 108a can use images from one or more cameras 104a to identify external objects around the system 100, such as other vehicles moving around or towards the system 100 or pedestrians or objects near the system 100. The object detection function 108a may also or alternatively identify internal objects within the system 100, such as by identifying a body and head of a driver of the system 100. The object detection function 108a can also identify one or more characteristics of each of one or more detected objects, such as an object class (a type of object) and a boundary around the detected object. As noted in FIG. 1, the object detection function 108a may represent or include one or more machine learning models that are at least partially trained using metamorphic labeling. Metamorphic labeling generally involves identifying object detection results obtained with different types of sensors and using one or more metamorphic relationships between the different types of sensors to identify labeled training data for the object detection machine learning model(s). The processor 102 also performs an object detection function 108b, which generally involves identifying objects around the system 100 in a real-time manner based on point clouds or other range data from the LIDAR sensor(s) 104b. Note that the object detection function 108b may alternatively be used to identifying objects around and/or within the system 100 based on data from another type of sensor, such as a different external or internal camera. Each object detection/tracking function 108a-108b can use any suitable technique to perform object detection and tracking, such as by using a trained machine learning model.

The processor 102 further performs a sensor fusion function 110, which generally involves combining measurements from different sensors 104 and/or combining information about the same objects from the object detection functions 108a-108b. For example, the sensor fusion function 110 may identify different object detection results that are determined based on information from the camera(s) 104a and LIDAR sensor(s) 104b or based on information from multiple cameras 104a, and inconsistent object detection results can be used for metamorphic labeling purposes as described in more detail below. The sensor fusion function 110 may also identify estimated locations or other information about the same object determined using images or other data from multiple sensors 104. The sensor fusion function 110 may combine measurements from different sensors 104 and/or information derived based on measurements from different sensors 104 in any suitable manner as needed or desired.

Information from the object detection functions 108a-108b and/or the sensor fusion function 110 (and possibly information from one or more other sources) may be provided to a decision planning function 112, which generally uses this information to determine how to adjust the operation of the system 100. For example, in an automotive vehicle, the decision planning function 112 may determine whether (and how) to change the steering direction of the vehicle, whether (and how) to apply the brakes or accelerate the vehicle, or whether (and how) to trigger an audible, visible, haptic, or other warning. The warning may indicate that the system 100 is near another vehicle, obstacle, or person, is departing from a current lane in which the vehicle is traveling, or is approaching a possible impact location with another vehicle, obstacle, or person. As another example, one or more characteristics of the driver (such as body position or head position/viewing direction) may be used by the decision planning function 112 to support driver monitoring, such as to detect if the driver appears drowsy or distracted and to trigger an audible, visible, haptic, or other warning to notify the driver. In general, the identified adjustments determined by the decision planning function 112 can vary widely based on the specific application.

The decision planning function 112 can interact with one or more control functions 114, each of which can be used to adjust or control the operation of one or more actuators 116 in the system 100. For example, in an automotive vehicle, the one or more actuators 116 may represent one or more brakes, electric motors, or steering components of the vehicle, and the control function(s) 114 can be used to apply or discontinue application of the brakes, speed up or slow down the electric motors, or change the steering direction of the vehicle. In general, the specific way(s) in which detected objects can be used may vary depending on the specific system 100 in which object detection is being used.

Note that the functions 108a-114 shown in FIG. 1 and described above may be implemented in any suitable manner in the system 100. For example, in some embodiments, various functions 108a-114 may be implemented or supported using one or more software applications or other software instructions that are executed by at least one processor 102. In other embodiments, at least some of the functions 108a-114 can be implemented or supported using dedicated hardware components. In general, the functions 108a-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108a-114 described above. This may allow, for instance, the processor(s) 102 to be used to process multiple images and other sensor data in parallel.

Although FIG. 1 illustrates one example of a system 100 supporting metamorphic labeling using aligned sensor data, various changes may be made to FIG. 1. For example, various functions and components shown in FIG. 1 may be combined, further subdivided, replicated, omitted, or rearranged and additional functions and components may be added according to particular needs. Also, as noted above, the functionality for object detection may be used in any other suitable system, and the system may or may not relate to automotive vehicles or other vehicles. In addition, the system 100 is described above as being used to perform both (i) object detection and (ii) metamorphic labeling using aligned sensor data. However, it is also possible for different devices or systems to perform these functions separately. For instance, a server or other system may receive images or other information (possibly captured by the system 100) and perform metamorphic labeling using aligned sensor data in order to support training of object detection models, and the server or other system may provide one or more trained machine learning models to the system 100 and other systems for use by the object detection function 108a.

Figure 2:
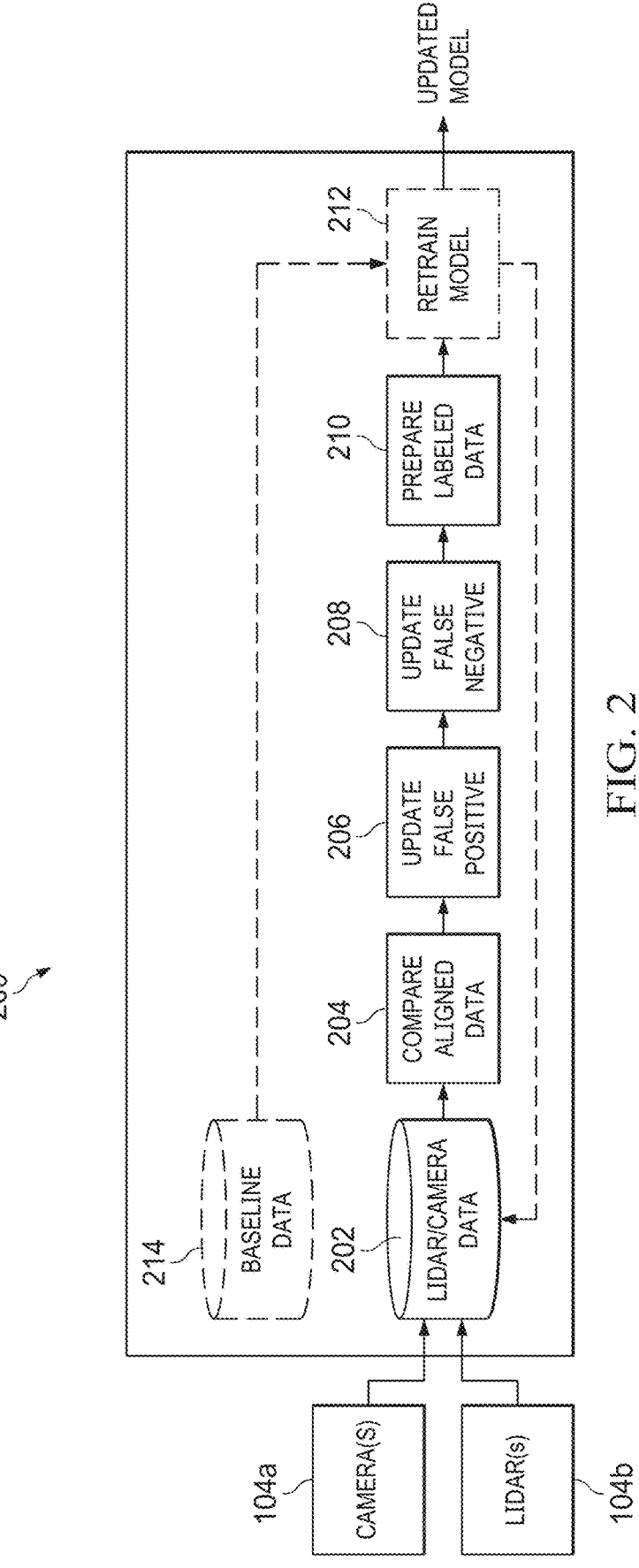
FIG. 2 illustrates an example architecture supporting metamorphic labeling using aligned sensor data according to this disclosure.

FIG. 2 illustrates an example architecture 200 supporting metamorphic labeling using aligned sensor data according to this disclosure. More specifically, the example architecture 200 shown in FIG. 2 may be used to implement metamorphic labeling to support the training (or retraining) of one or more machine learning models used by the object detection function 108a described above. For ease of explanation, the architecture 200 of FIG. 2 is described as being used in the system 100 of FIG. 1. However, the architecture 200 of FIG. 2 may be used in any other suitable device or system, such as any other suitable device or system supporting or using object detection. Also, for ease of explanation, the architecture 200 of FIG. 2 is described as being used to train or retrain of one or more machine learning models used by the object detection function 108*a* (which processes camera data) while using object detection results from the object detection function 108*b* (which processes LIDAR data). However, as noted above, the architecture 200 of FIG. 2 may be used with other types of sensors, such as two different types of cameras. Also, the sensor that produces reference object detection results used to adjust the machine learning model of the other sensor can vary, such as when different sensors are used to produce different reference object detection results over time.

As shown in FIG. 2, the architecture 200 receives or otherwise obtains collected data 202 from one or more cameras 104*a* and one or more LIDAR sensors 104*b* (or from one or more components that process information from the one or more cameras 104*a* and one or more LIDAR sensors 104*b* or other types of sensors, such as the object detection functions 108*a*-108*b*). For example, the collected data 202 may include information captured by the one or more cameras 104*a* and the one or more LIDAR sensors 104*b*, and/or the collected data 202 may include object detection results generated using information captured by the one or more cameras 104*a* and the one or more LIDAR sensors 104*b*. As particular examples, the collected data 202 may include images captured using one or more cameras 104*a* and LIDAR measurements captured using one or more LIDAR sensors 104*b*, as well as object detection results generated using these images and LIDAR measurements. Optionally, the images, LIDAR measurements, or other information may be pre-processed, such as to remove motion blur, radial distortions, other distortions or optical effects, or noise from the information.

In some embodiments, the information associated with one or more cameras 104*a* includes object detection results in the form of a tuple for each detected object generated by the object detection function 108*a*. Each tuple can include an object class (a type of object detected), a confidence score (a confidence in the detected object class), and image coordinates of a location of the object (a bounding box or other boundary of the detected object). For the camera(s) 104*a*, the tuples are generated by the object detection function 108*a* using captured images. Similarly, in some embodiments, the information associated with one or more LIDAR sensors 104*b* includes object detection results in the form of a tuple for each detected object generated by the object detection function 108*b*. Each tuple can include an object class (a type of object detected), a confidence score (a confidence in the detected object class), and image coordinates of a location of the object (a segmented point cloud or other boundary representing the detected object). For the LIDAR sensor(s) 104*b*, the tuples are generated by the object detection function 108*b* using input point clouds or other forms of range data. In some cases, one or more machine learning models may be used by the object detection function 108*a* to process the information from the camera(s) 104*a* and identify some of the tuples or other object detection results, and one or more machine learning models may be used by the object detection function 108*b* to process the information from the LIDAR sensor(s) 104*b* and identify others of the tuples or other object detection results.

Also, in some embodiments, the raw data generated by the camera(s) 104*a* and LIDAR sensor(s) 104*b* can be collected, calibrated, and time-aligned to generate at least part of the collected data 202 or to generate the object detection results that form at least part of the collected data 202. If the camera(s) 104*a* and LIDAR sensor(s) 104*b* have different data acquisition frequencies, the data can be aligned using timestamps and interpolated if needed in order to generate data at common times. For calibration of camera-based data, intrinsic parameters of a camera 104*a* (such as focal length and radial distortion parameters) and extrinsic parameters of the camera 104*a* (such as rotations and translations with respect to a reference frame, like a reference frame representing the origin of a vehicle coordinate frame) can be used. For calibration of LIDAR-based data, extrinsic parameters (such as rotations and translations with respect to a reference frame) of a LIDAR sensor 104*b* can be used. The camera(s) 104*a* and LIDAR sensor(s) 104*b* have at least one common field-of-view so that both camera and LIDAR measurements of a single object can be captured and used. It is therefore possible for the object detection functions 108*a*-108*b* to generate object detection results at or substantially near the same time, and the object detection results can ideally identify the same object(s) and the same properties of each object (although this is not necessarily guaranteed due to the different operations of the object detection functions 108*a*-108*b*).

The architecture 200 includes a comparison function 204, which compares the object detection results that are determined based on information from the different types of sensors 104. For example, when the camera(s) 104*a* and LIDAR sensor(s) 104*b* have a common field-of-view and all sensor parameters are known (such as when there are calibrated camera and LIDAR systems), it is possible the represent the camera-based and LIDAR-based object detection results in a single coordinate frame. The single coordinate frame may represent any suitable coordinate frame, such as the camera's image frame, a virtual image plane, or a birds-eye-view coordinate frame. Within the single coordinate frame, the comparison function 204 can compare the camera and LIDAR object detection results for consistency. Note that if the camera(s) 104*a* and LIDAR sensor(s) 104*b* have different fields-of-view, the comparison function 204 may convert object detection results from one or both of the camera(s) 104*a* and LIDAR sensor(s) 104*b* to a common coordinate frame prior to the comparison. Among other things, the comparison function 204 can identify inconsistent tuples or other inconsistent object detection results generated by the object detection functions 108*a*-108*b*. In some cases, inconsistencies can be identified when one object detection function 108*a* or 108*b* identifies an object that the other object detection function 108*b* or 108*a* does not identify. In some embodiments, the comparison function 204 uses LIDAR-based object detection results from the object detection function 108*b* as a reference in order to determine the quality of the corresponding camera-based object detection results from the object detection function 108*a*.

Figure 3:
FIG. 3 illustrates an example classification of machine learning output results according to this disclosure.

Inconsistencies between the camera-based and LIDAR-based object detection results may take various forms. For example, camera-based object detection results may include false positive errors and false negative errors (compared to the LIDAR-based object detection results). A false positive result refers to an error showing that an object has been detected when there is no actual object. A false negative result refers to an error showing no object has been detected when there is an actual object. FIG. 3 illustrates an example classification 300 of machine learning output results according to this disclosure. More specifically, FIG. 3 identifies the types of results (including errors) that may exist in object detection results. The results here include true positive results 302 and true negative results 304, which respectively refer to situations where the object detection functions 108*a*-108*b* correctly identify existing objects and correctly do not identify non-existing objects. The results also include false positive results 306, which identify false identifications of non-existent objects. The results further include false negative results 308, which identify failures to properly identify existing objects.

Figure 4A:
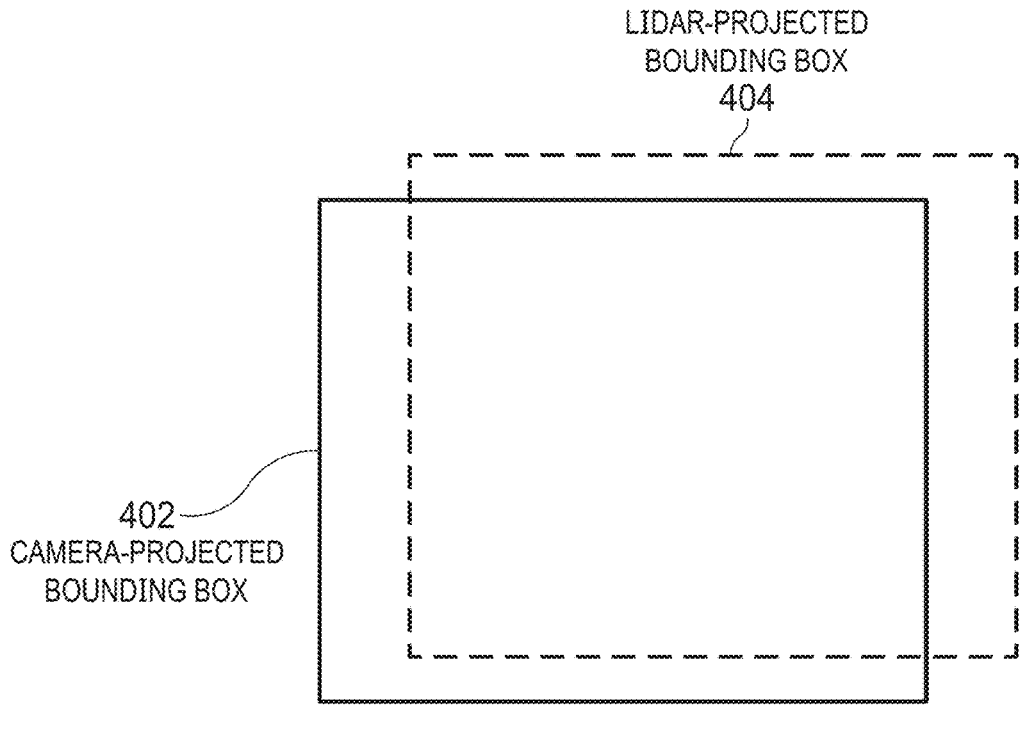
FIGS. 4A through 4D illustrate example types of machine learning output results obtained using multiple types of sensors according to this disclosure.
Figure 4B:
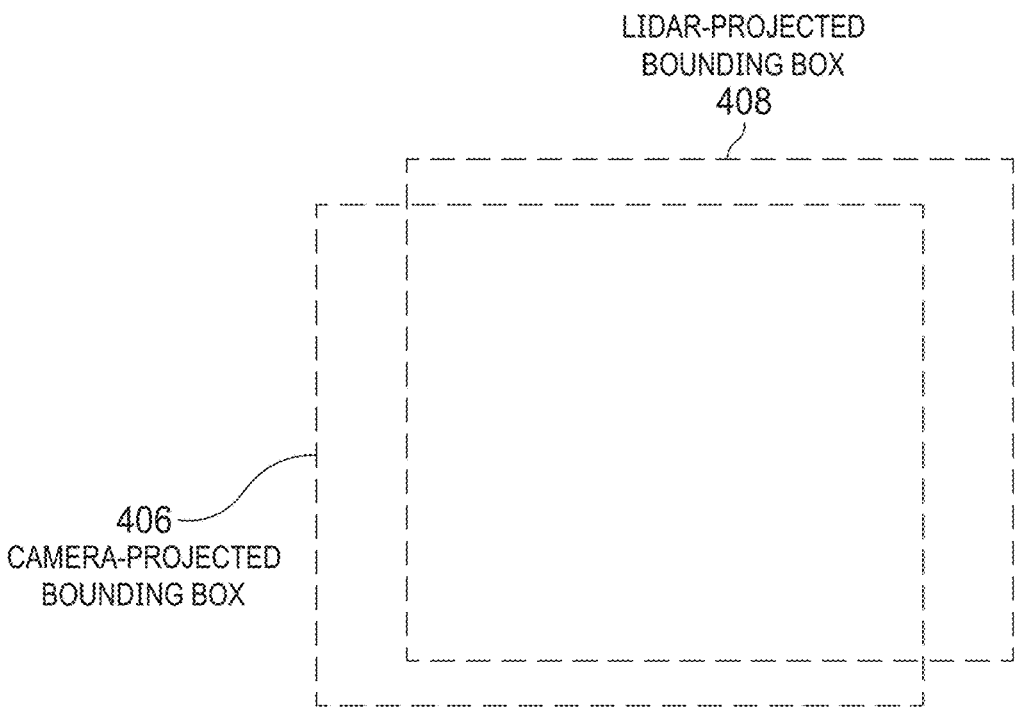
Figure 4C:
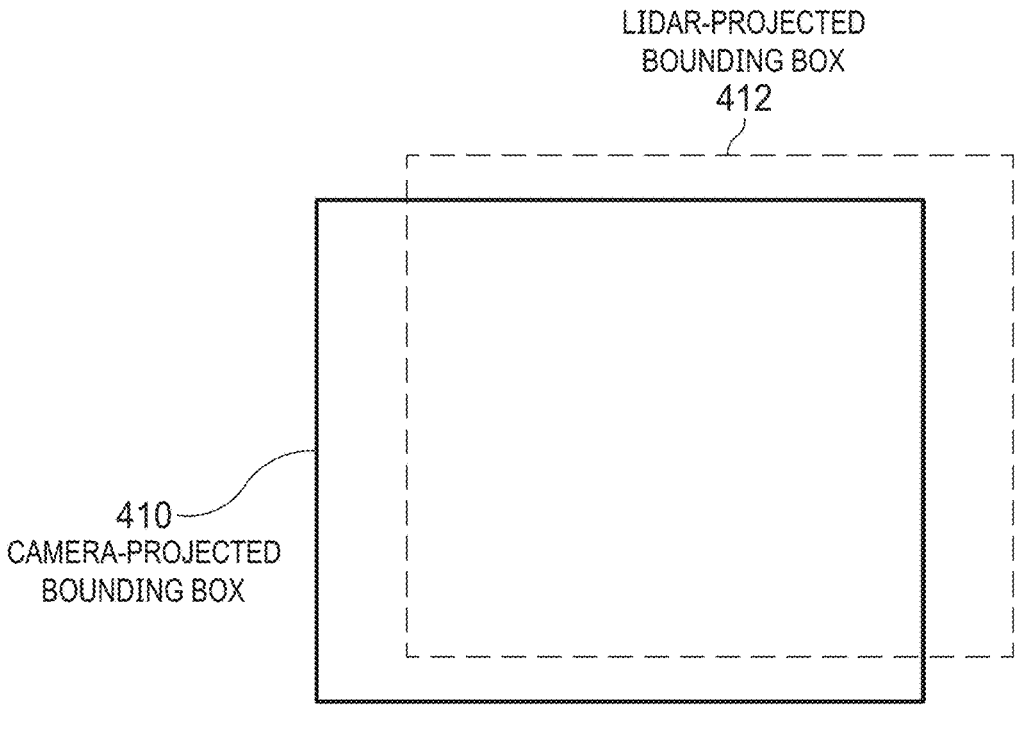
Figure 4D:
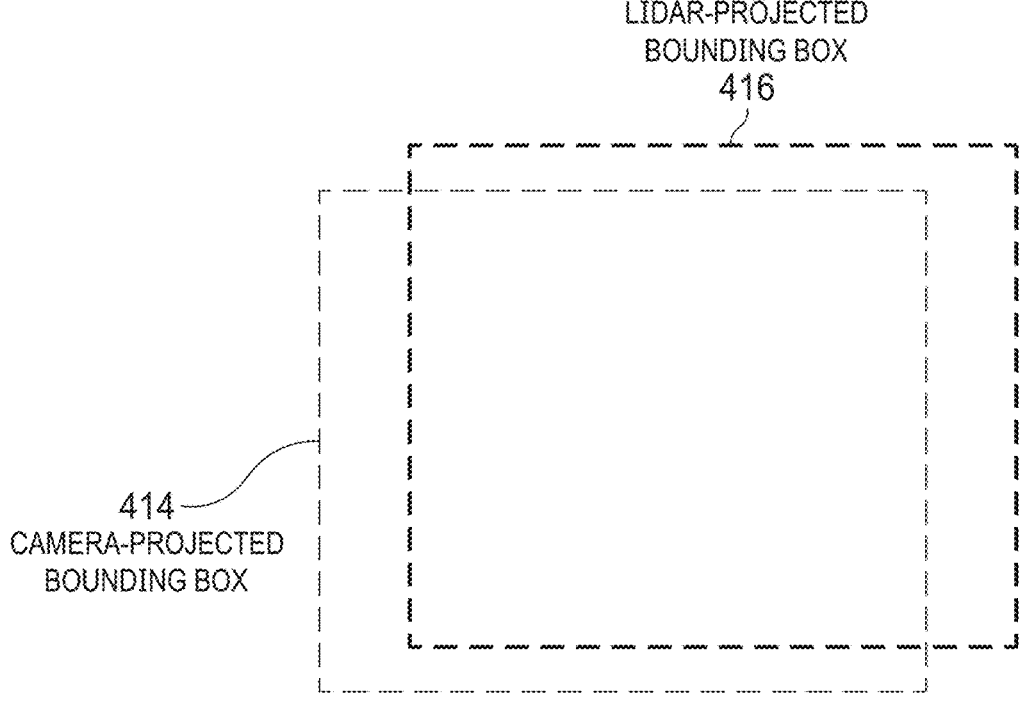

These types of results are illustrated in FIGS. 4A through 4D, which illustrate example types of machine learning output results obtained using multiple types of sensors according to this disclosure. In FIG. 4A, two boxes 402 and 404 respectively represent objects detected using camera-based and LIDAR-based data. Since the two boxes 402 and 404 substantially overlap (such as when there is overlap by at least a threshold amount or percentage), this indicates that the camera-based and LIDAR-based object detections are consistent (which is a true positive result 302). In FIG. 4B, two boxes 406 and 408 respectively represent a lack of objection detection using camera-based and LIDAR-based data. Since the two boxes 406 and 408 indicate that no objects were detected using either sensor type, this indicates that the camera-based and LIDAR-based object detections are consistent (which is a true negative result 304). In FIG. 4C, a box 410 represents an object detected using camera-based data, but a box 412 represents a lack of objection detection using LIDAR-based data. This indicates that the camera-based and LIDAR-based object detections are inconsistent (which is a false positive result 306). In FIG. 4D, a box 414 represents a lack of objection detection using camera-based data, but a box 416 represents an object detected using LIDAR-based data. This indicates that the camera-based and LIDAR-based object detections are inconsistent (which is a false negative result 308).

The architecture 200 here includes a false positive update function 206 and a false negative update function 208. The update functions 206 and 208 attempt to resolve the false positive and false negative inconsistencies between the camera-based and LIDAR-based object detection results. Each update function 206 and 208 may use any suitable technique to resolve inconsistencies between the camera-based and LIDAR-based object detection results. Example techniques performed by the update functions 206 and 208 are described in more detail below.

Information from the update functions 206 and 208 is provided to a labeled data preparation function 210, which uses the information to generate labeled training data. As described below, the labeled training data can be used to resolve false positive and false negative results generated by the object detection function 108*a*. Among other things, the labeled training data may lack object detection results for false positives (which helps train the object detection function 108*a* to not identify non-existent objects), and the labeled training data may include object detection results for false negatives (which helps train the object detection function 108*a* to identify existing objects). The labeled training data may be used by a retraining model function 212, which generally operates to retrain one or more machine learning models (or train one or more new machine learning models) used by the object detection function 108*a*. In some cases, the retraining model function 212 can have access to and use baseline data 214, which can represent the training data used to previously train the machine learning model(s) of the object detection function 108*a*. In that case, the retraining model function 212 can also use the baseline data 214 to retrain the machine learning model(s) or train the new machine learning model(s) of the object detection function 108*a*. If desired, the labeled training data can be stored as part of the baseline data 214 for use in a future iteration of the process shown in FIG. 2.

The following discussion provides example embodiments for performing the update functions 206 and 208. In the following discussion, a pair of related detection results is represented as (x, y), where x,y∈{1,0}. Here, x represents a LIDAR-based object detection result for a single object, y represents a corresponding camera-based object detection result for the single object, 1 represents a "detected" flag indicating that the object detection result detected the object, and 0 represents a "not detected" flag indicating that the object detection result did not detect the object. Thus, for example, (1, 1) would represent a situation where both camera-based and LIDAR-based object detection results detected the same object, (0, 0) would represent a situation where both camera-based and LIDAR-based object detection results did not detect a non-existing object, and (1, 0) and (0, 1) represent inconsistent object detection results. Note, however, that the same type of approach may be used with other pairs of sensor types, such as two different types of cameras.

The false positive update function 206 generally operates to correct or remove a false identification of an object when there was no object to be detected (according to the LIDAR sensor 104*b*). For a false positive result, the notation (0, 1) is used since no object was identified using the LIDAR-based data and an object was detected using the camera-based data. In some cases, the false positive result can be remedied by removing the tuple or other object detection result generated using the camera-based data. In other words, the false positive result can be remedied by removing the label for the non-existent object for the camera-based data. The camera-based data may then be included in the labeled training data provided by the preparation function 210, where the camera-based data lacks the label (the incorrect object detection result).

The false negative update function 208 generally operates to correct a failure to identify an object when there was an object to be detected (according to the LIDAR sensor 104*b*). This is generally more complicated than the false positive update function 206—the false positive update function 206 may simply remove an incorrect label, while the false negative update function 208 needs to identify a new correct label for an object. For a false negative result, the notation (1, 0) is used since an object was detected using the LIDAR-based data and no object was identified using the camera-based data. The false negative update function 208 may use any suitable technique to identify a new label for an object detected using LIDAR-based data, where the new label is used to train at least one camera-based machine learning model.

In some embodiments, the label for an object can be identified by the false negative update function 208 using a biased detector. As noted above, the camera-based object detection may suffer from false positive and false negative errors. It is possible to control the ratio between two types of errors by changing the detection threshold used for camera-based object detection. As a result, it is possible to create a biased detector by setting a specific detection threshold for that detector. Decreasing the detection threshold creates more false positives but fewer false negatives, while increasing the detection threshold creates fewer false positives but more false negatives. In general, a biased detector is not optimal, but it is possible to use a biased camera-based object detector with a reliable LIDAR-based object detector to catch weak object detection signals in the camera-based data. For example, when a camera-based object detector shows a false negative, the same camera-based object detector with a lower threshold (a biased detector producing many detection results) can show a different (correct) result. This updating from a false negative to a corrected result can occur either using the same camera-based object detector with a lower threshold or another camera-based object detector with the lower threshold.

In other embodiments, the label for an object can be identified by the false negative update function 208 using a projection of a segmented point cloud associated with the object from the LIDAR data onto an image plane of the camera(s) 104a. There are various ways to segment a point cloud forming LIDAR data, such as by using an inference model (like the LIDAR object detector) or by using a clustering algorithm after subtracting a ground plane from the whole point cloud. A segmented point cloud refers to a set of three-dimensional (3D) points $\{p_1, p_2, \ldots, p_N\}$, where $p_i$ is a 3D point defined as $p_i=[X_i, Y_i, Z_i, 1]'$ in a homogeneous coordinate system and where N represents the total number of points. Each point $p_i$ can be projected onto a corresponding image plane. In some cases, this projections can be performed based on the camera calibration parameters using a formula of $q_i=K [R, t, 0\ 0\ 0\ 1] p_i$, where K, R, and t respectively represent a 3×3 camera matrix, a 3×3 rotation matrix, and a 3×1 translation vector. Also, the projected image point $q_i$ corresponding to the point $p_i$ can be defined as $q_i=[u_i, v_i, 1]'$. Projecting the points from the segmented point cloud onto the image plane forms a two-dimensional (2D) point cloud corresponding to the object (or to the 3D point cloud) on the image. One specific technique that may be used here involves generating a 2D rectangle that tightly covers the projected 2D point cloud, which can be used as generated label data for the true object of the false negative error.

Ideally, the update functions 206 and 208 and the labeled data preparation function 210 here can be used to generate labeled training data in which all incorrect labels or missing labels from the camera-based object detection results are updated or corrected. The labeled training data can then be used to retrain one or more machine learning models used by the object detection function 108a or to train one or more new machine learning models for use by the object detection function 108a. Because the incorrect labels or missing labels from the camera-based object detection results are generally resolved, the trained or retrained machine learning model(s) can be used to provide more accurate camera object detection results. In some cases, the corrected labels here may be referred to as "pseudo" labels rather than ground truth labels (which may normally be generated by human annotators) since the corrected labels are generated in an automated manner and have not been verified by human annotators.

Note that the functions 204-212 shown in FIG. 2 and described above may be implemented in any suitable manner. For example, in some embodiments, various functions 204-212 may be implemented or supported using one or more software applications or other software instructions that are executed by at least one processor 102 or other device(s). In other embodiments, at least some of the functions 204-212 can be implemented or supported using dedicated hardware components. In general, the functions 204-212 described above may be performed using any suitable hardware or any suitable combination of hardware and software/firmware instructions.

Although FIG. 2 illustrates one example of an architecture 200 supporting metamorphic labeling using aligned sensor data, various changes may be made to FIG. 2. For example, various functions shown in FIG. 2 may be combined, further subdivided, replicated, omitted, or rearranged and additional functions may be added according to particular needs. Also, while the functions are described as being performed within the system 100, different functions may be performed by different components. For instance, a server or other external system may generate the labeled training data, train or retrain at least one model, and provide the retrained or new model(s) to the system 100 (with or without using information captured by the sensors 104 of the system 100). Although FIG. 3 illustrates one example of the classification of machine learning output results and FIGS. 4A through 4D illustrate examples of types of machine learning output results obtained using multiple types of sensors, various changes may be made to FIGS. 3 and 4A through 4D. For instance, the division of error types shown in FIG. 3 is for illustration only and merely meant to illustrate examples of different error types. Also, the actual machine learning output results from the object detection functions 108a-108b can differ from those shown in FIGS. 4A through 4D based on the environment around the system 100. In addition, while these figures are often described as using camera data and LIDAR data (with the LIDAR data being used to produce reference object detection results), other embodiments may use other pairs of sensors.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 5:
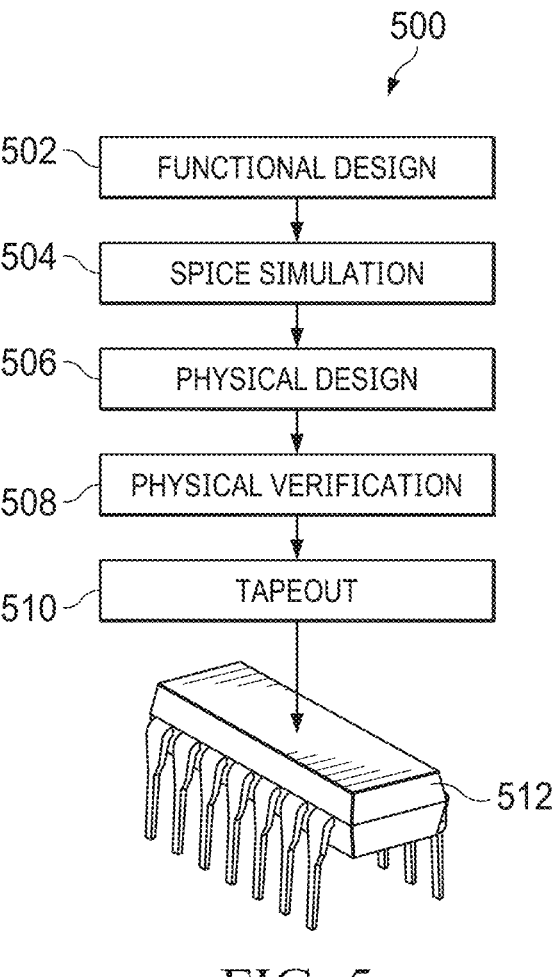
FIG. 5 illustrates an example design flow for employing one or more tools to design hardware that implements one or more functions according to this disclosure.

FIG. 5 illustrates an example design flow 500 for employing one or more tools to design hardware that implements one or more functions according to this disclosure. More specifically, the design flow 500 here represents a simplified ASIC design flow employing one or more EDA tools or other tools for designing and facilitating fabrication of ASICs that implement at least some functional aspects of the various embodiments described above.

As shown in FIG. 5, a functional design of an ASIC is created at step 502. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 504. This may include, for example, using the SPICE simulations or other simulations to verify that the functional design of the ASIC performs as expected.

A physical design of the ASIC is created based on the validated data structures and other aspects of the functional design at step 506. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 508. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 510. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 512.

Although FIG. 5 illustrates one example of a design flow 500 for employing one or more tools to design hardware that implements one or more functions, various changes may be made to FIG. 5. For example, at least some functional aspects of the various embodiments described above may be implemented in any other suitable manner.

Figure 6:
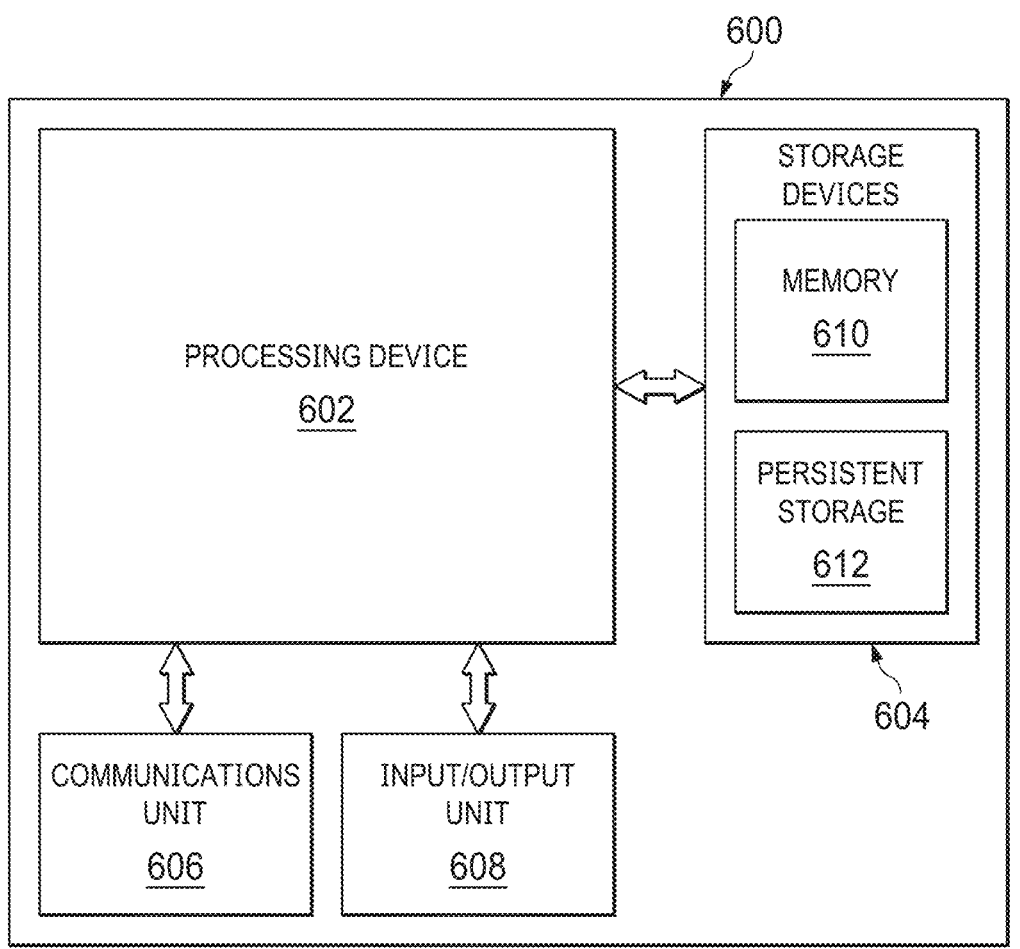
FIG. 6 illustrates an example device supporting execution of one or more tools to design hardware that implements one or more functions according to this disclosure.

FIG. 6 illustrates an example device 600 supporting execution of one or more tools to design hardware that implements one or more functions according to this disclosure. The device 600 may, for example, be used to implement at least part of the design flow 500 shown in FIG. 5. However, the design flow 500 may be implemented in any other suitable manner.

As shown in FIG. 6, the device 600 denotes a computing device or system that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other processing devices in any suitable arrangement. Example types of processing devices 602 include one or more microprocessors, microcontrollers, DSPs, ASICs, FPGAs, or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the device 600 does not require local I/O, such as when the device 600 represents a server or other device that can be accessed remotely.

The instructions that are executed by the processing device 602 include instructions that implement at least part of the design flow 500. For example, the instructions that are executed by the processing device 602 may cause the processing device 602 to generate or otherwise obtain functional designs, perform simulations, generate physical designs, verify physical designs, perform tape-outs, or create/use photomasks (or any combination of these functions). As a result, the instructions that are executed by the processing device 602 support the design and fabrication of ASIC devices or other devices that implement one or more functions described above.

Although FIG. 6 illustrates one example of a device 600 supporting execution of one or more tools to design hardware that implements one or more functions, various changes may be made to FIG. 6. For example, computing and communication devices and systems come in a wide variety of configurations, and FIG. 6 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining first data comprising camera image data and second data comprising light detection and ranging (LIDAR) range data;

obtaining first object detection results based on the first data using a first dynamically adjustable detection threshold and generated using a machine learning model, the first object detection results identifying one or more objects detected using the first data;

obtaining second object detection results based on the second data using a second static detection threshold, the second object detection results identifying one or more objects detected using the second data;

dynamically adjusting the first dynamically adjustable detection threshold using a biased detector;

identifying one or more inconsistencies between the first and second object detection results;

generating labeled training data based on the one or more identified inconsistencies, the labeled training data including one or more corrected labels, and the labeled training data being generated using the biased detector; and retraining the machine learning model or training an additional machine learning model using the labeled training data.

2. The method of claim 1, wherein:

identifying the one or more inconsistencies comprises identifying one or more false positive results and one or more false negative results in the first object detection results compared to the second object detection results; and generating the labeled training data comprises generating the labeled training data based on the one or more false positive results and the one or more false negative results.

3. The method of claim 2, wherein the labeled training data comprises:

the image data associated with the one or more false positive results without the first object detection results associated with the one or more false positive results being used as labels; and the image data associated with the one or more false negative results with the one or more corrected labels replacing the first object detection results associated with the one or more false negative results.

4. The method of claim 1, further comprising:

identifying at least one action to be performed using the machine learning model or the additional machine learning model; and performing the at least one action.

5. The method of claim 4, wherein the at least one action comprises at least one of:

an adjustment to at least one of: a steering of a vehicle, a speed of the vehicle, an acceleration of the vehicle, and a braking of the vehicle; and an activation of an audible, visible, or haptic warning.

6. An apparatus comprising:

at least one processing device configured to:

obtain first data comprising camera image data and second data comprising light detection and ranging (LIDAR) range data;

obtain first object detection results based on the first data using a first dynamically adjustable detection threshold and generated using a machine learning model, the first object detection results identifying one or more objects detected using the first data;

obtain second object detection results based on the second data using a second static detection threshold, the second object detection results identifying one or more objects detected using the second data;

dynamically adjusting the first dynamically adjustable detection threshold using a biased detector;

identify one or more inconsistencies between the first and second object detection results;

generate labeled training data based on the one or more identified inconsistencies, the labeled training data including one or more corrected labels, and the corrected labels being generated using the biased detector; and retrain the machine learning model or train an additional machine learning model using the labeled training data.

7. The apparatus of claim 6, wherein:

to identify the one or more inconsistencies, the at least one processing device is configured to identify one or more false positive results and one or more false negative results in the first object detection results compared to the second object detection results; and to generate the labeled training data, the at least one processing device is configured to generate the labeled training data based on the one or more false positive results and the one or more false negative results.

8. The apparatus of claim 7, wherein the labeled training data comprises:

the image data associated with the one or more false positive results without the first object detection results associated with the one or more false positive results being used as labels; and the image data associated with the one or more false negative results with the one or more corrected labels replacing the first object detection results associated with the one or more false negative results.

9. The apparatus of claim 6, wherein the at least one processing device is further configured to:

identify at least one action to be performed using the machine learning model or the additional machine learning model; and perform the at least one action.

10. The apparatus of claim 9, wherein the at least one action comprises at least one of:

an adjustment to at least one of: a steering of a vehicle, a speed of the vehicle, an acceleration of the vehicle, and a braking of the vehicle; and an activation of an audible, visible, or haptic warning.

11. A non-transitory machine-readable medium containing instructions that when executed cause at least one processor to:

obtain first data comprising camera image data and second data comprising light detection and ranging (LI-DAR) range data;

obtain first object detection results based on the first data and generated using a machine learning model, the first object detection results identifying one or more objects detected using the first data;

obtain second object detection results based on the second data using a first dynamically adjustable detection threshold, the second object detection results identifying one or more objects detected using the second data;

dynamically adjust the first dynamically adjustable detection threshold using a biased detector;

identify one or more inconsistencies between the first and second object detection results;

generate labeled training data based on the one or more identified inconsistencies, the labeled training data including one or more corrected labels, and the labeled training data being generated using the biased detector; and retrain the machine learning model or train an additional machine learning model using the labeled training data.

12. The non-transitory machine-readable medium of claim 11, wherein:

the instructions that when executed cause the at least one processor to identify the one or more inconsistencies comprise instructions that when executed cause the at least one processor to identify one or more false positive results and one or more false negative results in the first object detection results compared to the second object detection results; and the instructions that when executed cause the at least one processor to generate the labeled training data comprise instructions that when executed cause the at least one processor to generate the labeled training data based on the one or more false positive results and the one or more false negative results.

13. The non-transitory machine-readable medium of claim 12, wherein the labeled training data comprises:

the image data associated with the one or more false positive results without the first object detection results associated with the one or more false positive results being used as labels; and the image data associated with the one or more false negative results with the one or more corrected labels replacing the first object detection results associated with the one or more false negative results.

14. The non-transitory machine-readable medium of claim 11, further containing instructions that when executed cause the at least one processor to:

identify at least one action to be performed using the machine learning model or the additional machine learning model; and perform the at least one action.

15. The non-transitory machine-readable medium of claim 14, wherein the at least one action comprises at least one of:

an adjustment to at least one of: a steering of a vehicle, a speed of the vehicle, an acceleration of the vehicle, and a braking of the vehicle; and an activation of an audible, visible, or haptic warning.

* * * * *